United States Patent
Nelson et al.

(10) Patent No.: US 10,591,303 B2
(45) Date of Patent: Mar. 17, 2020

(54) GAMING SYSTEM AND METHOD FOR LOCATING AN ELECTRONIC GAMING MACHINE WITH A MOBILE DEVICE

(71) Applicant: IGT, Las Vegas, NV (US)

(72) Inventors: Dwayne R. Nelson, Las Vegas, NV (US); Steven G. LeMay, Reno, NV (US)

(73) Assignee: IGT, Las Vegas, NV (US)

( * ) Notice: Subject to any disclaimer, the term of this patent is extended or adjusted under 35 U.S.C. 154(b) by 39 days.

(21) Appl. No.: 15/925,030

(22) Filed: Mar. 19, 2018

(65) Prior Publication Data

US 2018/0209794 A1    Jul. 26, 2018

Related U.S. Application Data

(63) Continuation of application No. 15/215,220, filed on Jul. 20, 2016, now Pat. No. 9,927,244.

(51) Int. Cl.
*G01C 21/20* (2006.01)
*G07F 17/32* (2006.01)
*G07F 17/34* (2006.01)

(52) U.S. Cl.
CPC ........ *G01C 21/206* (2013.01); *G07F 17/3211* (2013.01); *G07F 17/3225* (2013.01); *G07F 17/34* (2013.01)

(58) Field of Classification Search
CPC ... G01C 21/206; G07F 17/34; G07F 17/3225; G07F 17/3211
USPC ...................................................... 701/469
See application file for complete search history.

(56) References Cited

U.S. PATENT DOCUMENTS

| | | |
|---|---|---|
| 4,799,683 A | 1/1989 | Bruner, Jr. |
| 5,011,149 A | 4/1991 | Purnell |
| 5,025,372 A | 6/1991 | Burton et al. |
| 5,096,195 A | 3/1992 | Gimmon |
| 5,168,969 A | 12/1992 | Mayhew |
| 5,179,517 A | 1/1993 | Sarbin et al. |
| 5,232,191 A | 8/1993 | Infanti |
| 5,240,249 A | 8/1993 | Czarnecki et al. |
| 5,242,163 A | 9/1993 | Fulton |
| 5,429,363 A | 7/1995 | Hayashi |
| 5,489,010 A | 2/1996 | Rogers |
| 5,579,002 A | 11/1996 | Iggulden et al. |
| 5,636,346 A | 6/1997 | Saxe |
| 5,721,827 A | 2/1998 | Logan et al. |

(Continued)

*Primary Examiner* — Atul Trivedi
(74) *Attorney, Agent, or Firm* — Neal, Gerber & Eisenberg LLP

(57) ABSTRACT

The gaming system and method of the present disclosure leverage casino patrons' mobile devices to facilitate directing the patrons exactly to their desired electronic gaming machines (EGMs). In various embodiments, the gaming system includes a central controller communicatively connected to a plurality of EGMs. The central controller receives a request from a patron's mobile device to find a desired one of the EGMs. The central controller causes the desired EGM and the patron's mobile device to output the same patron identifier, such as a patron-created image, and causes the patron's mobile device to use GPS to direct the patron to the vicinity of the desired EGM. Once the patron is within the vicinity of the desired EGM, the patron can quickly scan the surrounding EGMs to determine the one outputting the patron identifier, which is the patron's desired EGM.

19 Claims, 8 Drawing Sheets

(56) References Cited

U.S. PATENT DOCUMENTS

| | | |
|---|---|---|
| 5,761,647 A | 6/1998 | Boushy |
| 5,762,617 A | 6/1998 | Infanti |
| 5,770,533 A | 6/1998 | Franchi |
| 5,794,210 A | 8/1998 | Goldhaber et al. |
| 5,826,240 A | 10/1998 | Brockman et al. |
| 5,913,487 A | 6/1999 | Leatherman |
| 5,971,271 A | 10/1999 | Wynn et al. |
| 5,983,196 A | 11/1999 | Wendkos |
| 5,999,808 A | 12/1999 | LaDue |
| 6,091,066 A | 7/2000 | Sugihara |
| 6,120,025 A | 9/2000 | Hughes |
| 6,178,408 B1 | 1/2001 | Copple et al. |
| 6,257,981 B1 | 7/2001 | Acres et al. |
| 6,270,410 B1 | 8/2001 | DeMar et al. |
| 6,280,328 B1 | 8/2001 | Holch et al. |
| 6,293,485 B1 | 9/2001 | Hollowed |
| 6,343,990 B1 | 2/2002 | Rasmussen et al. |
| 6,364,765 B1 | 4/2002 | Walker et al. |
| 6,422,670 B1 | 7/2002 | Hedrick et al. |
| 6,454,649 B1 | 9/2002 | Mattice et al. |
| 6,638,166 B2 | 10/2003 | Hedrick et al. |
| 6,676,522 B2 | 1/2004 | Rowe et al. |
| 6,702,672 B1 | 3/2004 | Angell et al. |
| 6,846,238 B2 | 1/2005 | Wells |
| 6,962,531 B2 | 11/2005 | Pace et al. |
| 6,971,956 B2 | 12/2005 | Rowe et al. |
| 7,094,149 B2 | 8/2006 | Walker et al. |
| 7,300,352 B2 | 11/2007 | Rowe |
| 7,611,409 B2 | 11/2009 | Muir et al. |
| 7,637,810 B2 | 12/2009 | Amaitis |
| 8,523,672 B2 | 9/2013 | Kryuchkov et al. |
| 9,613,497 B2 | 4/2017 | Miller |
| 9,754,443 B2 | 9/2017 | Hedrick |
| 2002/0123381 A1 | 9/2002 | Akeripa |
| 2002/0167486 A1 | 11/2002 | Tan et al. |
| 2003/0013515 A1 | 1/2003 | Rowe et al. |
| 2003/0032479 A1 | 2/2003 | LeMay et al. |
| 2003/0045354 A1 | 3/2003 | Giobbi |
| 2003/0050117 A1 | 3/2003 | Silva et al. |
| 2003/0064805 A1 | 4/2003 | Wells |
| 2003/0119543 A1 | 6/2003 | Kfoury et al. |
| 2003/0216174 A1 | 11/2003 | Gauselmann |
| 2004/0038725 A1 | 2/2004 | Kaminkow |
| 2004/0040617 A1 | 3/2004 | Dietrich |
| 2004/0082384 A1 | 4/2004 | Walker et al. |
| 2004/0118669 A1 | 6/2004 | Mou |
| 2004/0140617 A1 | 7/2004 | Cordell |
| 2006/0046849 A1 | 3/2006 | Kovacs |
| 2006/0148560 A1 | 7/2006 | Arezina et al. |
| 2006/0149846 A1 | 7/2006 | Schuba |
| 2006/0252530 A1 | 11/2006 | Oberberger et al. |
| 2007/0045958 A1 | 3/2007 | Rader et al. |
| 2007/0054739 A1 | 3/2007 | Amaitis et al. |
| 2007/0087810 A1 | 4/2007 | Walker et al. |
| 2007/0202941 A1 | 8/2007 | Miltenberger et al. |
| 2007/0225911 A1 | 9/2007 | Chanick |
| 2008/0076572 A1 | 3/2008 | Nguyen et al. |
| 2008/0167106 A1 | 7/2008 | Lutnick et al. |
| 2008/0182644 A1* | 7/2008 | Lutnick ............... G07F 17/3258 463/20 |
| 2008/0201578 A1 | 8/2008 | Drake |
| 2008/0300055 A1* | 12/2008 | Lutnick ............... G06K 9/00375 463/39 |
| 2008/0318698 A1 | 12/2008 | Wynn |
| 2009/0017913 A1 | 1/2009 | Bell |
| 2009/0093300 A1 | 4/2009 | Lutnick |
| 2009/0098921 A1* | 4/2009 | Manning ............ G06Q 20/3224 463/17 |
| 2009/0098943 A1 | 4/2009 | Weber et al. |
| 2010/0048302 A1 | 2/2010 | Lutnick |
| 2010/0093429 A1 | 4/2010 | Mattice |
| 2010/0113161 A1 | 5/2010 | Walker et al. |
| 2010/0130280 A1* | 5/2010 | Arezina ............... G07F 17/3206 463/20 |
| 2010/0169514 A1 | 7/2010 | Noguchi et al. |
| 2011/0065490 A1 | 3/2011 | Lutnick |
| 2011/0093723 A1 | 4/2011 | Brown et al. |
| 2011/0275432 A1 | 11/2011 | Lutnick |
| 2013/0012317 A1 | 1/2013 | Kryuchkov et al. |
| 2013/0017884 A1 | 1/2013 | Price et al. |
| 2013/0023339 A1 | 1/2013 | Davis et al. |
| 2013/0053148 A1 | 2/2013 | Nelson et al. |
| 2013/0102372 A1 | 4/2013 | Lutnick |
| 2013/0116032 A1 | 5/2013 | Lutnick |
| 2013/0137464 A1* | 5/2013 | Kramer ................ G06Q 30/02 455/456.3 |
| 2013/0225282 A1 | 8/2013 | Williams |
| 2013/0232003 A1 | 9/2013 | Yeo |
| 2013/0252713 A1 | 9/2013 | Nelson |
| 2013/0260879 A1* | 10/2013 | Saunders ............. G07F 17/323 463/29 |
| 2013/0296009 A1* | 11/2013 | Ginsberg ............ G07F 17/3237 463/11 |
| 2013/0310156 A1 | 11/2013 | Gadher |
| 2014/0045586 A1* | 2/2014 | Allen .................. G07F 17/3288 463/25 |
| 2014/0155145 A1* | 6/2014 | Arezina ............... G07F 17/3216 463/25 |
| 2014/0213350 A1 | 7/2014 | Froy |
| 2014/0370978 A1* | 12/2014 | Pececnik ............. G07F 17/3211 463/31 |
| 2015/0228153 A1 | 8/2015 | Hedrick |
| 2016/0019746 A1 | 1/2016 | Lyons |
| 2016/0078725 A1 | 3/2016 | Price et al. |
| 2016/0093154 A1* | 3/2016 | Bytnar ................ G07F 17/3218 463/25 |
| 2016/0343197 A1 | 11/2016 | Traphagen |
| 2017/0249806 A1 | 8/2017 | Lutnick |
| 2018/0053194 A1* | 2/2018 | Bond ................... G06Q 30/02 |
| 2019/0043310 A1* | 2/2019 | Higgins .............. G07F 17/3251 |

\* cited by examiner

GAMING SYSTEM AND METHOD FOR LOCATING AN ELECTRONIC GAMING MACHINE WITH A MOBILE DEVICE

PRIORITY CLAIM

This application is a continuation of, claims priority to and the benefit of U.S. patent application Ser. No. 15/215,220, which was filed on Jul. 20, 2016, the entire contents of which is incorporated herein by reference.

COPYRIGHT NOTICE

This patent document contains material subject to copyright protection. The copyright owner does not object to photocopy reproduction of the patent document in the form it appears in the U.S. Patent and Trademark Office records, but otherwise reserves all copyright rights.

BACKGROUND

Typical casinos include tens of thousands of square feet of gaming space that's home to hundreds or thousands of electronic gaming machines (EGMs), such as slot machines, video poker machines, video lottery terminals, video keno machines, and/or video bingo machines. For instance, the Bellagio resort in Las Vegas, Nev., has 116,000 square feet of gaming space that includes 2,300 EGMs.

To maximize the quantity of EGMs (and other entertainment offerings, such as table games) in the gaming space, casinos typically arrange the EGMs in densely packed rows. EGMs in a particular row are usually separated by a few inches. Rows of EGMs are often spaced apart just far enough so one patron can walk between the rows while others are playing the EGMs. Many casinos also line their perimeter walls with tightly spaced EGMs. Some casinos create banks of EGMs in circular arrangements throughout the gaming space. FIG. 1 shows one example of part of the gaming space of a casino including several rows of EGMs.

Each EGM is operable to enable a player to play a wagering game. A typical wagering game includes a primary game, and certain wagering games include one or more bonus games. Countless different types of primary and bonus games exist, meaning that a given casino likely offers hundreds or even thousands of different wagering games on its EGMs. Also, each EGM typically has one of several different denominations, such as 1¢, 2¢, 5¢, 25¢, $1, or $5. Some EGMs are multi-denominational, and enable the player to choose his desired denomination from a set of several different denominations.

The sheer size of a casino's gaming space, its complex and densely packed layout, the large quantity of EGMs, the variety of different wagering games offered on those EGMs, and the variety of different available EGM denominations—not to mention the hundreds or thousands of people in the casino—make it difficult and time consuming for a patron to locate a particular EGM the patron wants to play. For instance, a patron may visit a casino for the first time and want to play her favorite 25¢ denomination TRIPLE PLAY DRAW POKER game (TRIPLE PLAY DRAW POKER is a registered trademark of IGT Corporation). The patron has to wander around the casino and inspect each EGM she walks past to try to find that particular EGM among the hundreds or thousands of different EGMs distributed across tens of thousands of square feet of gaming space. This often frustrates the patron because in many cases she has to waste a significant amount of time searching for her desired EGM, and in some cases may never find it (or find it occupied). This also frustrates the casino operators because the patron is wandering around the casino rather than playing her favorite EGM.

One proposed solution to this problem involves guiding a patron to her desired EGM using a global positioning system (GPS), such as via a casino-provided mobile device. This solution fails because GPS lacks the necessary granularity to guide the patron exactly to her desired EGM. GPS is typically accurate within 5-15 meters (16.4-49.2 feet). This may suffice when directing someone to a restaurant off of a highway, but it's not useful to direct a patron to an EGM located within a few feet of several other EGMs. With only 5-15 meter accuracy, the GPS can't direct the patron exactly to her desired EGM. It can at best direct the patron to the general vicinity of her desired EGM, but at that point the patron must resume the search herself by scouring every EGM in the area. The fact that GPS doesn't work well indoors in certain instances compounds this problem.

There is a continuing need to develop new and improved ways to direct patrons exactly to their desired EGMs (or other locations within a casino) that solve this problem.

SUMMARY

The gaming system and method of the present disclosure solve this problem by leveraging casino patrons' mobile devices to facilitate directing the patrons exactly to their desired EGMs.

In various embodiments, the gaming system includes a central controller communicatively connected to a plurality of EGMs. After a patron's mobile device communicatively connects to the central controller, the central controller receives a request from the patron's mobile device to find a desired one of the plurality of EGMs. The central controller then causes both the desired EGM and the patron's mobile device to output the same patron identifier. For example, in one embodiment, the central controller causes the desired EGM and the patron's mobile device to display the same photograph, which the central controller receives from the patron's mobile device. The central controller also causes the patron's mobile device to use GPS to direct the patron to the vicinity of the desired EGM (i.e., as close as it can given GPS's limited accuracy with respect to this application). Once the patron is within the vicinity of the desired EGM, the patron can quickly scan the surrounding EGMs to determine the one outputting the patron identifier, which is the patron's desired EGM.

The gaming system and method of the present disclosure provide a new and improved way to direct patrons exactly to their desired EGMs using a combination of GPS (or another suitable navigation system) and mutual output of a patron identifier by the patron's mobile device and the desired EGM. The GPS directs the patron to the vicinity of the desired EGM, while the mutual output of the patron identifier enables the patron to quickly confirm which surrounding EGM is her desired EGM. The patron will no longer have to wander the casino searching through hundreds or thousands of EGMs looking for her favorite or be frustrated by the inaccuracy of GPS alone to direct her to her desired EGM.

Additional features and advantages are described in, and will be apparent from, the following Detailed Description and the Figures.

DETAILED DESCRIPTION

The gaming system and method of the present disclosure solve the above-described problem by leveraging casino patrons' mobile devices to facilitate directing the patrons exactly to their desired EGMs.

In various embodiments, the gaming system includes a central controller communicatively connected to a plurality of EGMs. After a patron's mobile device communicatively connects to the central controller, the central controller receives a request from the patron's mobile device to find a desired one of the plurality of EGMs. The central controller then causes both the desired EGM and the patron's mobile device to output the same patron identifier. The central controller also causes the patron's mobile device to use GPS (or another suitable navigation system) to direct the patron to the vicinity of the desired EGM (i.e., as close as it can given GPS's limited accuracy with respect to this application). Once the patron is within the vicinity of the desired EGM, the patron can quickly scan the surrounding EGMs to determine the one outputting the patron identifier, which is the patron's desired EGM.

1. Gaming System

The embodiments described herein may be implemented in accordance with any of a variety of different gaming systems. A "gaming system" as used herein refers to various configurations of one or multiple central servers, central controllers, or remote hosts (collectively, "central controllers" for brevity) and/or one or more EGMs. Thus, in various embodiments, the gaming system of the present disclosure includes one or multiple EGMs either alone or in combination with one or multiple central controllers. For brevity and clarity and unless indicated otherwise, "EGM" represents one or multiple EGMs and "central controller" represents one or multiple central controllers.

As noted above, in various embodiments, the gaming system includes an EGM and a central controller. In these embodiments, the EGM and the central controller are communicatively connected to one another through a data network. In certain of these embodiments, the EGM is communicatively connected to another EGM through the same or a different data network.

Figure 1:
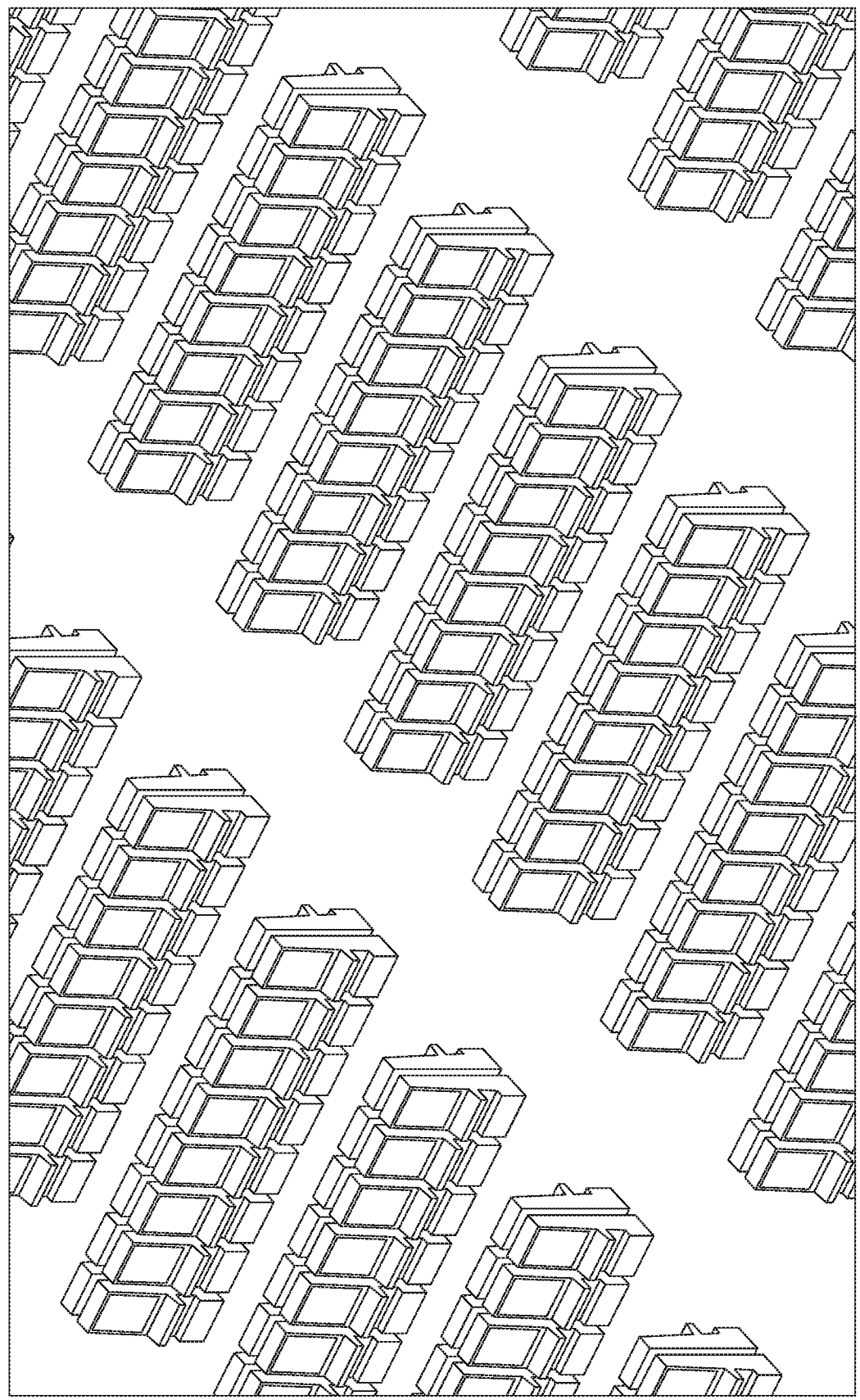
FIG. 1 illustrates one example of part of the gaming space of a casino including several rows of EGMs and a circular arrangement of EGMs.
Figure 2:
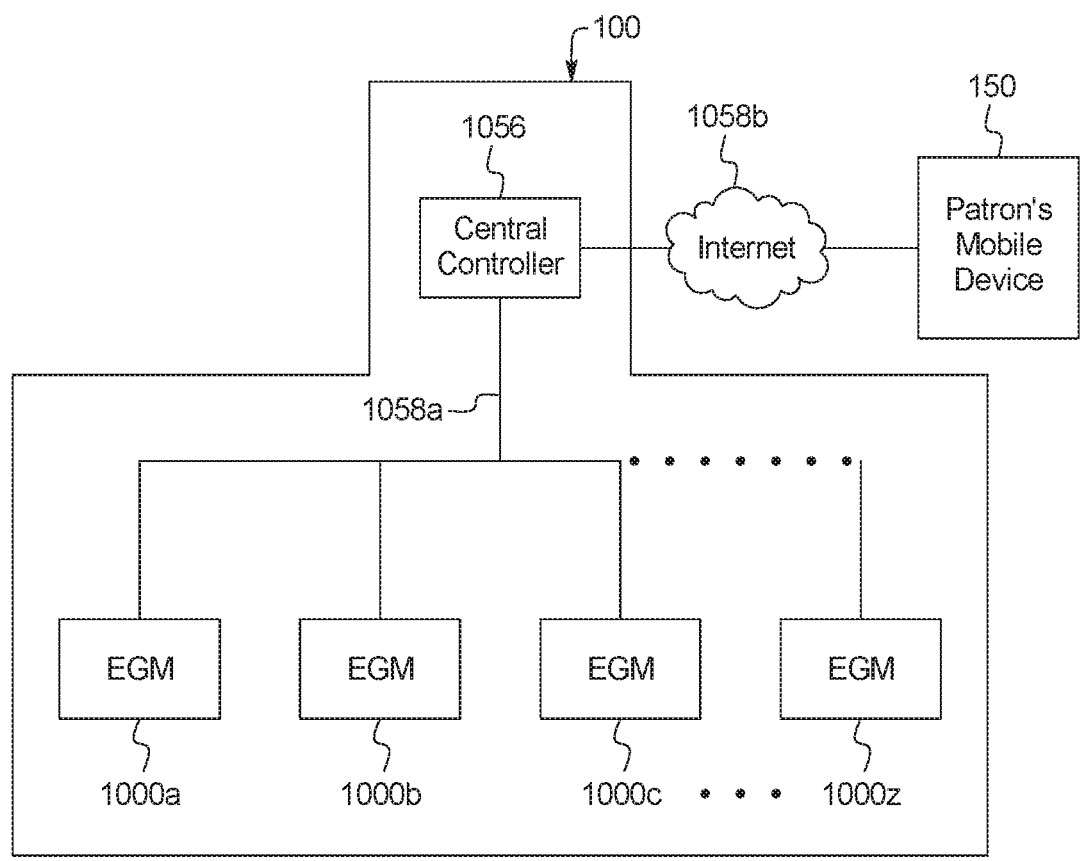
FIG. 2 is a schematic block diagram of one embodiment of a gaming system of the present disclosure communicatively connected to a patron's mobile device via the Internet.

In one example embodiment shown in FIG. 2, the gaming system 100 includes a central controller 1056 communicatively connected to a plurality of EGMs 1000a, 1000b, 1000c, . . . 1000z via a data network 1058a. The gaming system 100, and particularly the central controller 1056, is communicatively connectable to a patron's mobile device 150 over the Internet 1058b. The patron's mobile device 150 may be any suitable mobile computing device, such as a tablet computing device, a mobile phone (such as a smartphone), a personal digital assistant, a wearable computing device (such as a smartwatch), or a laptop computer. While here only one patron's mobile device is shown as being communicatively connected to the gaming system, the gaming system may be communicatively connected with multiple patrons' mobile devices at any given point in time to simultaneously direct their respective patrons to their respective desired EGMs.

The data networks 1058a and 1058b may be any suitable networks, such as a local area network, a wide area network, an internet (such as the Internet), or an intranet. The data networks 1058a and 1058b may be the same or different. The central controller, the EGM, and the patron's mobile device are configured to connect to the data network in any suitable wired or wireless manner, such as via: a conventional phone or other data transmission line, a digital subscriber line (DSL), a T-1 line, a coaxial cable, a fiber optic cable, a routing device, a mobile communications network connection (such as a cellular network or mobile Internet network), or any other suitable network interface.

In certain embodiments, the central controller is any suitable computing device (such as a server) that includes at least one central controller processor and at least one central controller memory device (such as any of those described below for the EGMs 1000). As further described herein, the EGM includes at least one EGM processor configured to transmit and receive data or signals representing events, messages, commands, or any other suitable information between the EGM and the central controller. The at least one EGM processor is configured to execute the events, messages, or commands represented by these data or signals in conjunction with the operation of the EGM. Moreover, the at least one central controller processor is configured to transmit and receive data or signals representing events, messages, commands, or any other suitable information between the central controller and the EGM. The at least one central controller processor is configured to execute the events, messages, or commands represented by these data or signals in conjunction with the operation of the central controller. The at least one EGM processor may perform one, more than one, or each of the functions of the central controller. Further, the at least one central controller processor may perform one, more than one, or each of the functions of the EGM.

In certain embodiments, the central controller executes the computerized instructions for controlling any games the EGM displays. In these "thin client" embodiments, the central controller remotely controls any games (or other suitable interfaces) the EGM displays, and the EGM displays those games (or suitable interfaces) and receives one or more inputs or commands. In other embodiments, the central controller communicates computerized instructions for controlling games the EGM displays, and the at least one EGM memory device stores these instructions. In these "thick client" embodiments, the at least one EGM processor executes the computerized instructions to control any games (or other suitable interfaces) the EGM displays.

In various embodiments in which the gaming system includes a plurality of EGMs, one or more of the EGMs are thin-client EGMs and one or more of the EGMs are thick-client EGMs. In other embodiments in which the gaming system includes one or more EGMs, certain functions of one or more of the EGMs are implemented in a thin-client environment, and certain other functions of one or more of the EGMs are implemented in a thick-client environment. In one such embodiment in which the gaming system includes an EGM and a central controller, the central controller communicates computerized instructions for controlling primary games the EGM displays to the EGM in a thick-client configuration, and the central controller executes computerized instructions for controlling any bonus games or other functions the EGM displays in a thin-client configuration.

In certain embodiments, an Internet browser of the EGM is usable to access an Internet game page from any location where an Internet connection is available. In one such embodiment, after the EGM accesses the Internet game page, the central controller identifies a player before enabling that player to place any wagers on any plays of any wagering games. In one example, the central controller identifies the player by requiring a player account of the player to be logged into via an input of a unique username and password combination assigned to the player. The central controller may identify the player in any other suitable manner, such as (but not limited to) by: (1) validating a player tracking identification number associated with the player; (2) reading a player tracking card or other smart card inserted into a card reader (as described below); (3) validating a unique player identification number associated with the player by the central controller; and/or (4) identifying the EGM (e.g., identifying the MAC address or the IP address of the Internet facilitator). In various embodiments, once the central controller identifies the player, the central controller enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

2. Directing a Casino Patron to a Desired EGM

Figure 3:
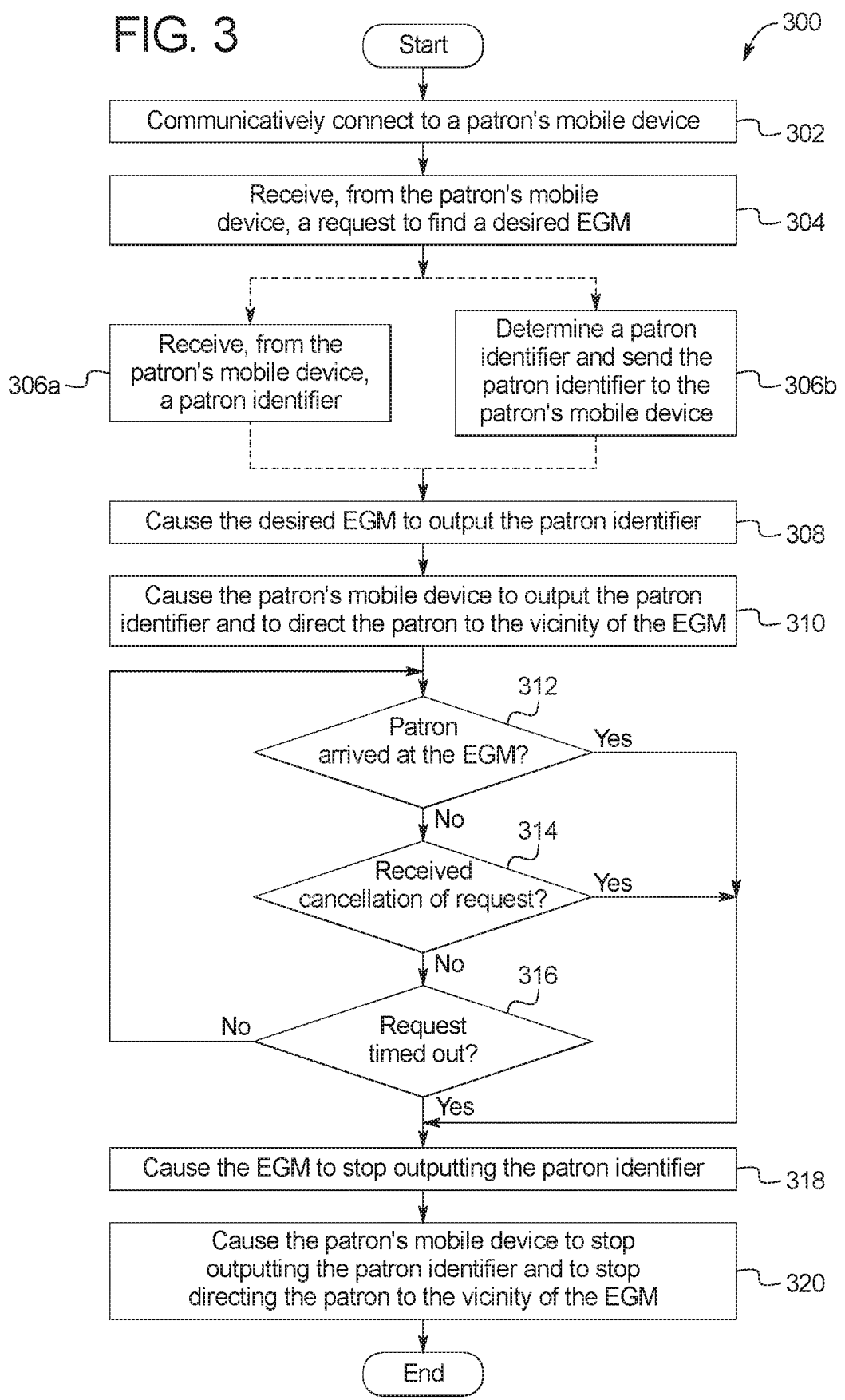
FIG. 3 is a flowchart representing a process for directing a casino patron to a desired EGM using the patron's mobile device.

FIG. 3 is a flowchart of an example process 300 of operating the gaming system of the present disclosure to direct a casino patron to a desired EGM. In various embodiments, a set of instructions stored in one or more memories and executed by one or more processors represents the process 300. Although the process 300 is described with reference to the flowchart shown in FIG. 3, many other processes of performing the acts associated with this illustrated process 300 may be employed. For example, the order of certain of the illustrated blocks or diamonds may be changed, certain of the illustrated blocks or diamonds may be optional, or certain of the illustrated blocks or diamonds may not be employed.

The gaming system 100 implements this example process 300 (though the process 300 may be modified for execution by any other gaming system disclosed herein). In operation of this example embodiment, the process 300 begins when the patron's mobile device 150 communicatively connects to the central controller 1056 of the gaming system 100, as block 302 indicates. In various embodiments, the patron's mobile device communicatively connects to the central controller via the Internet and/or a cellular network. In certain of these embodiments, the patron's mobile device communicatively connects to the central controller when a particular mobile application—such as a mobile application associated with the gaming establishment—is launched on the patron's mobile device. In another of these embodiments, the patron's mobile device communicatively connects to the central controller when the patron's mobile device connects to a wireless Internet network the gaming establishment hosts and the central controller can also access (either directly or via one or more other networks).

Once the patron's mobile device 150 and the central controller 1056 are communicatively connected, the central controller 1056 receives, from the patron's mobile device 150, a request to find a desired EGM (e.g., via representative data or a signal(s)), as block 304 indicates. In certain embodiments, the central controller sends a list of all EGMs (or available EGMs) to the patron's mobile device from which the patron can pick a desired EGM. In other embodiments, the central controller sends a list of the EGMs that patron has played the most within a particular period from which the patron can pick a desired EGM (which may be stored in association with that patron's player tracking account). In other embodiments, the central controller sends a list of a designated quantity of the patron's most recently played EGMs from which the patron can pick a desired EGM (which may be stored in association with that patron's player tracking account) (e.g., the EGMs played during a particular quantity of the patron's previous visit(s) or the EGMs played during a particular period of time immediately preceding the sending of the list). In other embodiments, the central controller determines which EGMs the patron may enjoy based on stored data associated with the patron (e.g., demographic data or game play data), and sends a list of recommended EGMs to the patron's mobile device from which the patron can pick a desired EGM. In other embodiments, the central controller (or the patron's mobile device) filters the list of EGMs based on patron-set filters, such as (but not limited to): (1) primary game type (e.g., reel-based, card-based, or keno-based); (2) primary game sub-type (e.g., triple play poker, 10 play poker, 50 play poker, or 100 play poker); (3) bonus game availability (e.g., bonus game(s) available or bonus game(s) not available); (4) denomination (e.g., 1¢, 2¢, 5¢, 25¢, $1, or $5); (5) volatility (e.g., high, medium, or low volatility); (6) average expected payback percentage; (7) primary game release date; (8) availability (e.g., EGM currently available to be played); (9) EGM location (e.g., near a bathroom, near an entrance/exit); (10) game theme (e.g., Wheel of Fortune or Little Green Men); (11) quantity of reels for a reel-based game; and/or (12) game popularity (which could be measured based on the quantity of games played or the amount of coin-in within a particular period).

Once the central controller 1056 receives the request to find the desired EGM—here, EGM 1000a—depending on the embodiment, the central controller 1056 either: (1) receives, from the patron's mobile device 150, a patron identifier, as block 306a indicates (e.g., via representative data or a signal(s)); or (2) determines a patron identifier and sends that patron identifier to the patron's mobile device 150, as block 306b indicates. The patron identifier may be any suitable identifier, such as (but not limited to): (1) a still image (such as a photograph); (2) a video; (3) a sound; and/or (4) a lighted pattern.

In embodiments in which the central controller receives the patron identifier from the patron's mobile device, the patron's mobile device may enable the patron to: (1) select the patron identifier from a set of patron-created patron identifiers stored on the patron's mobile device (e.g., a gallery of photographs the patron has taken using the patron's mobile device that are stored on the patron's mobile device); (2) select the patron identifier from a set of non-patron-created patron identifiers the central controller has sent to the patron's mobile device (e.g., a list of non-patron-created video clips the central controller sent to the patron's mobile device); or (3) create a patron identifier (e.g., use a touch screen of the patron's mobile device to create a drawing, use a camera of the patron's mobile device to take a photo, or use a microphone of the patron's mobile device to record audio).

In some of these embodiments, after the central controller receives the patron identifier, the central controller determines whether that patron identifier is currently being used to direct any other patrons' mobile devices to their respective patron's desired EGMs. If that patron identifier is currently being used to direct any other patrons' mobile devices to their respective patron's desired EGMs, the central controller causes the patron's mobile device to indicate to the patron that the patron must pick a different patron identifier. Put differently, the central controller ensures that it (or any other central controllers) is not directing another patron to an EGM via that specific patron identifier, which avoids inadvertently directing a patron to the wrong EGM.

In embodiments in which the central controller determines the patron identifier, the central controller picks the patron identifier from a set of different patron identifiers. The central controller may do so randomly, according to a predetermined order, or in any other suitable manner. In doing so, the central controller ensures that it picks a patron identifier that is not currently being used to direct any other patrons' mobile devices to their respective patron's desired EGMs.

Figure 4:
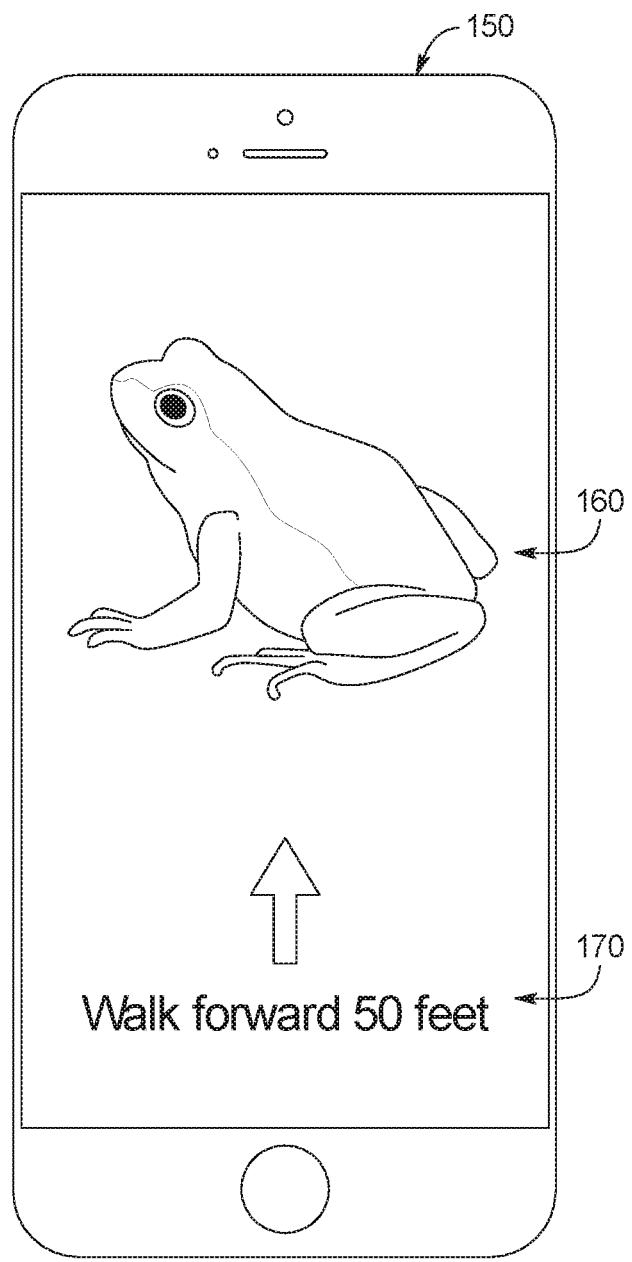
FIG. 4 illustrates an example mobile device outputting a patron identifier.
Figure 5:
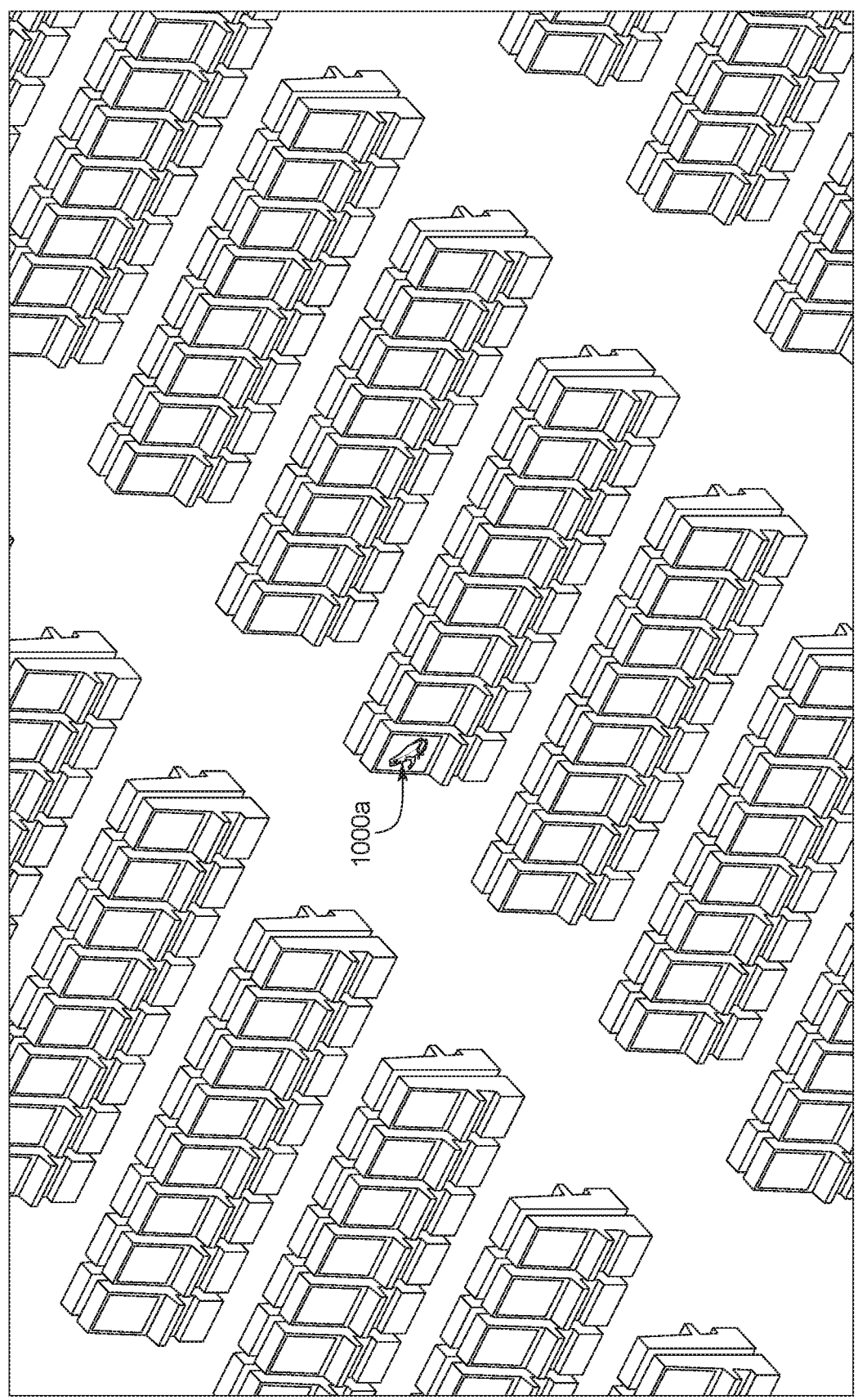
FIG. 5 illustrates the gaming space of FIG. 1 in which the patron's desired EGM is outputting the patron identifier also output by the mobile device of FIG. 4.

Once the central controller 1056 receives or determines a patron identifier, the central controller 1056 causes the desired EGM 1000a to output the patron identifier, as block 308 indicates. The central controller 1056 also causes the patron's mobile device 150 to output the patron identifier and to direct the patron identifier to the vicinity of the desired EGM via GPS or another suitable navigation system, as block 310 indicates. FIG. 4 illustrates the patron's mobile device 150 displaying a patron identifier 160, and FIG. 5 illustrates the desired EGM 1000a displaying the same patron identifier 160. As noted above, other suitable navigation systems, such as Wi-Fi triangulation or radio-frequency based systems, may be used instead of GPS. In certain embodiments, the patron's mobile device displays an overhead map of the casino that shows the patron's location.

After causing the desired EGM 1000a and the patron's mobile device 150 to output the patron identifier 160, the central controller 1056 determines whether the patron has arrived at the desired EGM 1000a, as diamond 312 indicates. In certain embodiments, the central controller determines that the patron has arrived at the desired EGM when the patron logs into the patron's player tracking account via the desired EGM (e.g., by inserting her player tracking card into the player tracking card reader of the desired EGM). In other embodiments, the central controller determines that the patron has arrived at the desired EGM when the patron enters a particular code via an input device of the EGM (e.g., by inputting an alphanumeric unlock code the central controller caused to be sent to the patron's mobile device). In other embodiments, the central controller determines that the patron has arrived at the desired EGM when the patron's mobile device communicatively connects to the desired EGM (as described in U.S. Patent Application Publication No. 2016/0078725, the entire contents of which are incorporated herein by reference). In other embodiments, the central controller determines that the patron has arrived at the desired EGM via facial recognition technology and a camera of the EGM.

If at diamond 312 the central controller 1056 determines that the patron has arrived at the desired EGM 1000a, the process 300 proceeds to block 318, described below. But if at diamond 312 the central controller 1056 determines that the patron has not yet arrived at the desired EGM 1000a, the central controller 1056 determines whether it has received a cancellation of the patron's request, as diamond 314 indicates. In certain embodiments, the patron's mobile device enables the patron to input a cancel request. In other embodiments, the central controller interprets a loss of communications with the patron's mobile device (either immediately upon communications loss or following a set period of time of communications loss) as receipt of a cancellation request.

If at diamond 314 the central controller 1056 determines that it has received a cancellation request, the process 300 proceeds to block 318, described below. But if at diamond 314 the central controller 1056 determines that it has not received a cancellation request, the central controller 1056 determines whether the patron's request has timed out, as diamond 316 indicates. The central controller allots a patron a set period of time to identify herself at the desired EGM after the desired EGM begins outputting the patron identifier. After this period of time expires, the central controller deems the patron's request timed out. This period of time may be predetermined, based on patron demographics (e.g., longer for older patrons than for younger patrons), or based on the location of the patron's mobile device when the desired EGM begins outputting the patron identifier (e.g., the further the patron's mobile device from the desired EGM, the longer the period of time). In certain embodiments, the central controller is configured to monitor the location of the patron's mobile device relative to the desired EGM, and extend the period of time if the patron's mobile device is moving toward the desired EGM.

If at diamond 316 the central controller 1056 determines that the patron's request has not timed out, the process 300 returns to diamond 312.

If: (1) at diamond 312 the central controller 1056 determines that the patron has arrived at the desired EGM 1000a; (2) at diamond 314 the central controller 1056 determines that it has received a cancellation request; or (3) at diamond 316 the central controller 1056 determines that the patron's request has timed out, the central controller 1056: (1) causes the desired EGM 1000a to stop outputting the patron identifier 160, as block 318 indicates; and (2) causes the patron's mobile device 150 to stop outputting the patron identifier 160 and to stop directing the patron to the vicinity of the EGM, as block 320 indicates. The process 300 then ends.

In certain embodiments, the desired EGM is communicatively connected to the patron's mobile device and performs some or all of the above-described steps instead of the central controller. In other words, the desired EGM itself could perform some or all of the above steps without assistance from the central controller.

In various embodiments, if a patron's desired EGM is occupied, the central controller and the patron's mobile device enable the patron to set an availability alert for that desired EGM. The central controller periodically polls the desired EGM to determine when it becomes available. After the central controller determines that the desired EGM has become available, the central controller alerts the patron's mobile device, which in turn alerts the patron. If the patron still wants to find that desired EGM, the patron indicates this to the patron's mobile device, and the process proceeds as described above.

Instead of causing the desired EGM and the patron's mobile device to output the same patron identifier, the gaming system may cause the desired EGM and the patron's mobile device to output complementary or otherwise related patron identifiers. For instance, the gaming system may cause the desired EGM and the patron's mobile device to display images with the same outlines but different colors or two halves of a cohesive image.

In various embodiments, when an EGM is displaying a patron identifier for a particular patron, the EGM prevents other patrons from initiating a gaming session or playing a game on the EGM. Put differently, an EGM displaying a patron identifier is reserved for the corresponding patron.

In certain embodiments, the gaming system may direct a player to something other than an EGM, such as a particular table game (that includes a device that can output the patron identifier), a particular bar or restaurant (that includes a device that can output the patron identifier), or a particular kiosk (that includes a device that can output the patron identifier).

The present disclosure contemplates that:
(a) the patron identifier;
(b) the period of time; and/or
(c) any other variables or determinations described herein may be:
(1) predetermined; (2) randomly determined; (3) randomly determined based on one or more weighted percentages (such as according to a weighted table); (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an EGM; (9) determined independent of a random determination at the EGM; (10) determined based on at least one play of at least one game; (11) determined independent of at least one play of at least one game; (12) determined based on a patron's selection; (13) determined independent of a patron's selection; (14) determined based on one or more side wagers placed; (15) determined independent of one or more side wagers placed; (16) determined based on the patron's wager or wager level; (17) determined independent of the patron's wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the patron (i.e., a player tracking status); (23) determined independent of a status of the patron (i.e., a player tracking status); (24) determined based on one or more other determinations disclosed herein; (25) determined independent of any other determination disclosed herein; or (26) determined in any other suitable manner or based on or independent of any other suitable factor(s).

3. EGM Components

Figure 6:
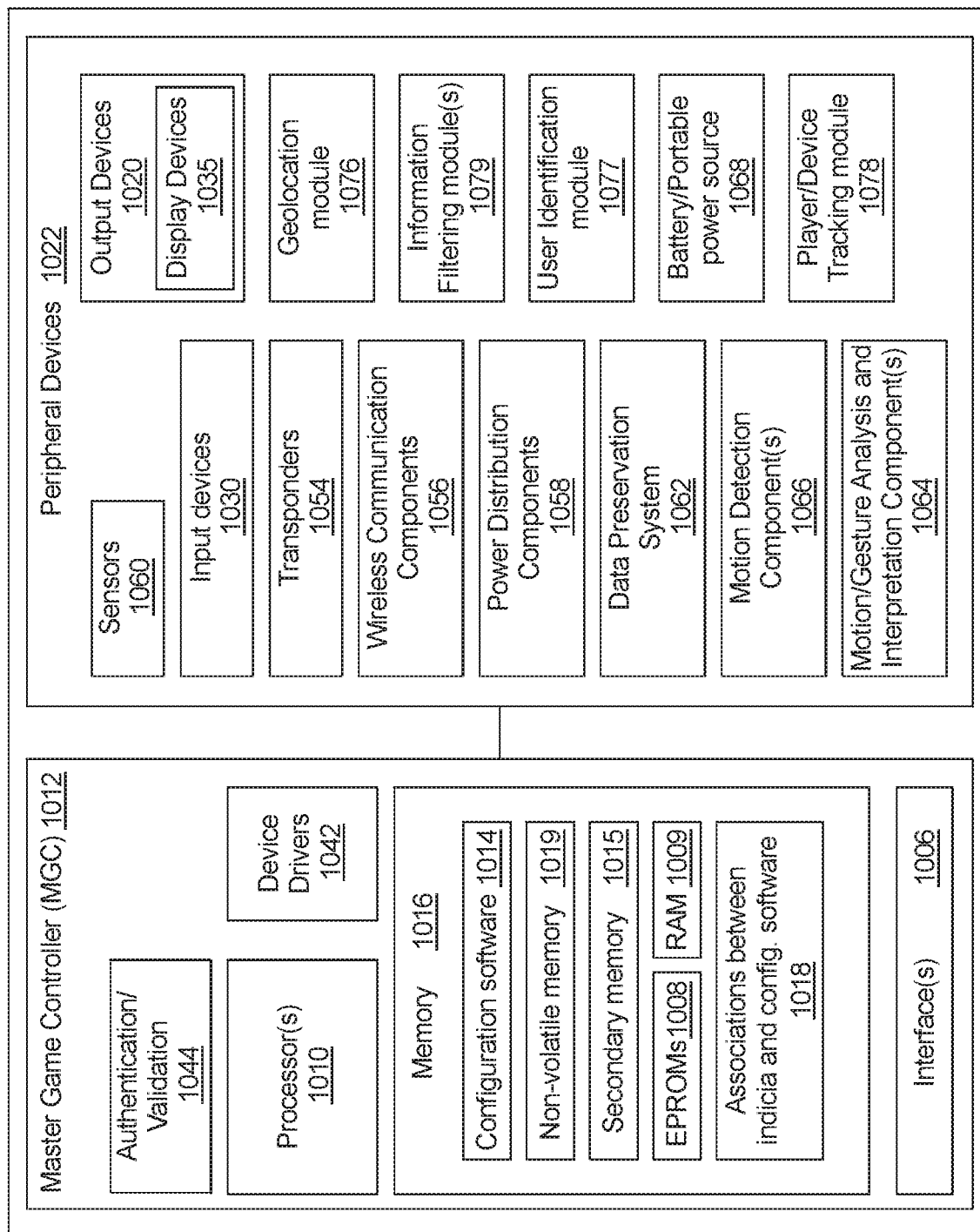
FIG. 6 is a schematic block diagram of an example electronic configuration of an EGM of the present disclosure.
Figure 7A:
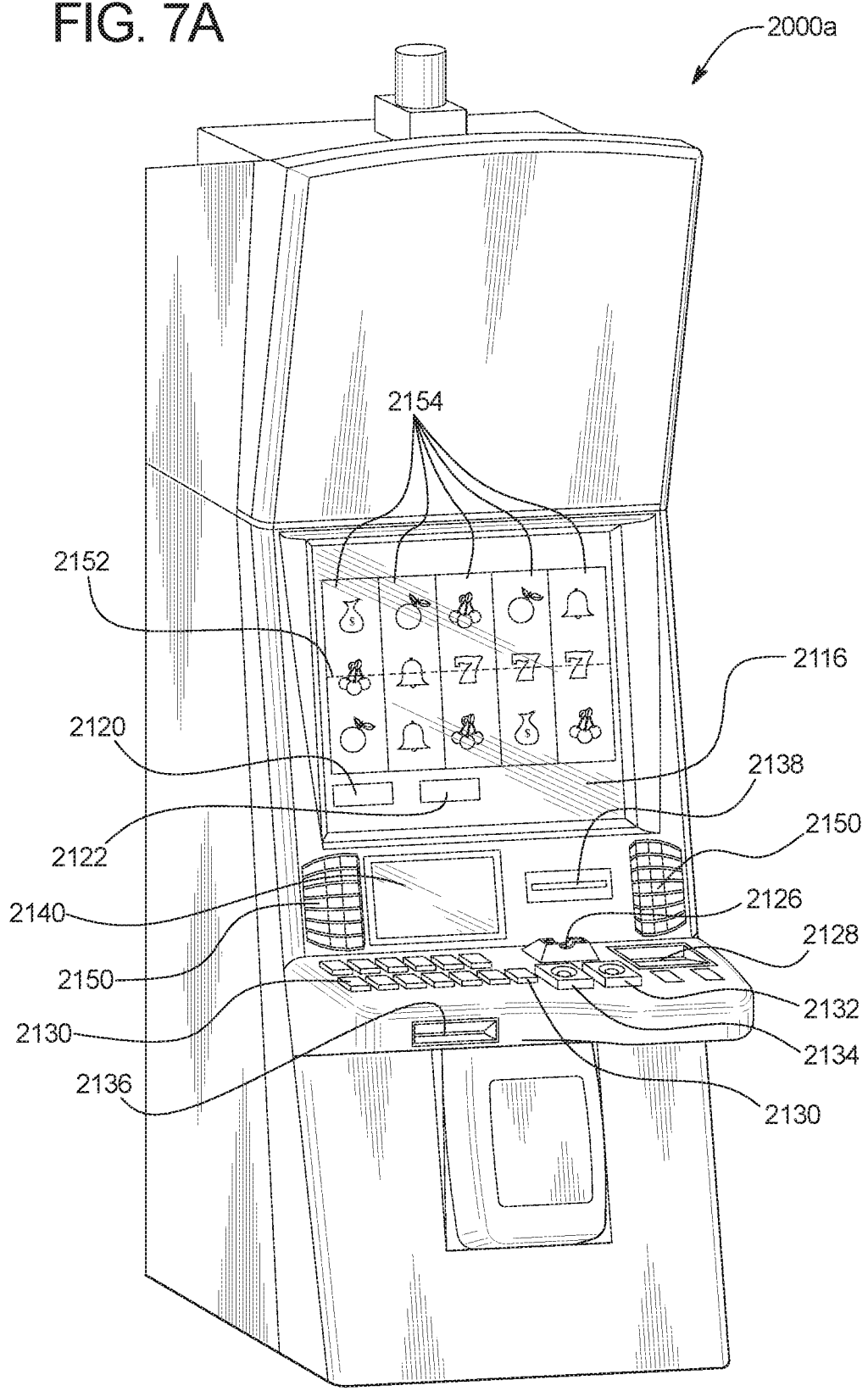
FIGS. 7A and 7B are perspective views of example alternative embodiments of an EGM of the present disclosure.
Figure 7B:
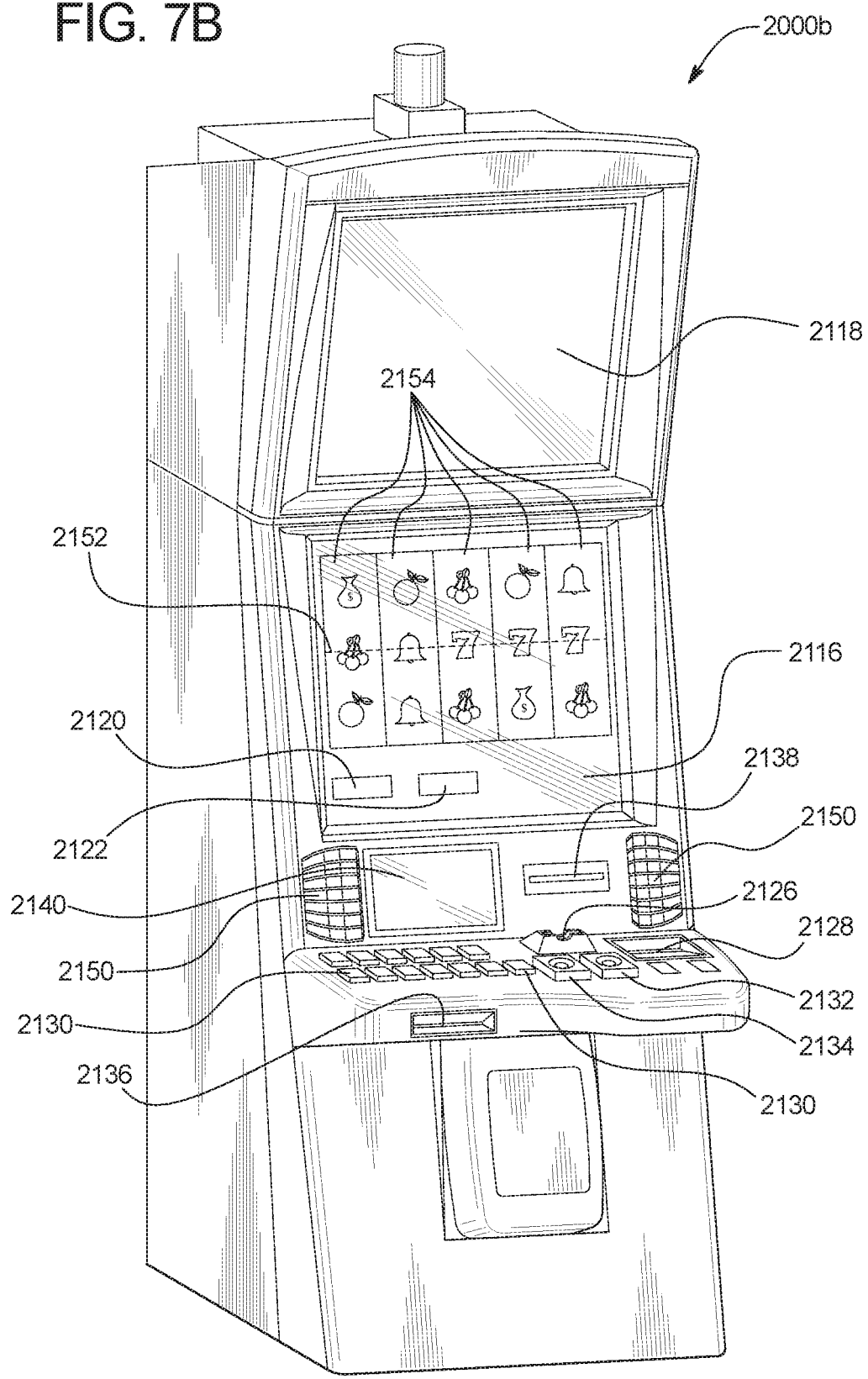

FIG. 6 is a block diagram of an example EGM 1000 and FIGS. 7A and 7B include two different example EGMs 2000a and 2000b. The EGMs 1000, 2000a, and 2000b are merely example EGMs, and different EGMs may be implemented using different combinations of the components shown in the EGMs 1000, 2000a, and 2000b.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000a illustrated in FIG. 7A includes a central display device 2116, a player tracking display 2140, a credit display 2120, and a bet display 2122. The example EGM 2000b illustrated in FIG. 7B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000a and 2000b illustrated in FIGS. 7A and 7B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000a and 2000b illustrated in FIGS. 7A and 7B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000a and 2000b illustrated in FIGS. 7A and 7B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 7A and 7B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 7A and 7B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 7A and 7B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 7A and 7B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 7A and 7B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 7A and 7B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

4. Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central controller and a changeable EGM, the at least one memory device of the central controller stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central controller is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central controller to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data.

In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central controller and an EGM, the EGM is configured to communicate with the central controller for monitoring purposes only. In such embodiments, the EGM determines the game outcome(s) and/or award(s) to be provided in any of the manners described above, and the central controller monitors the activities and events occurring on the EGM. In one such embodiment, the gaming system includes a real-time or online accounting and gaming information system configured to communicate with the central controller. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000b shown in FIG. 7B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

5. Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a processor; and
a memory device that stores instructions that, when executed by the processor, cause the processor to:
communicatively connect, via a network interface, to a mobile device of a patron,
receive, via the network interface and from the mobile device, data representing a request to find a desired location within a gaming establishment, the desired location within the gaming establishment being different from a current location of the mobile device, and
prior to the patron arriving at the desired location within the gaming establishment, cause a display device at the desired location to display a patron identifier.

2. The system of claim 1, wherein when executed by the processor, the instructions cause the processor to cancel the request responsive to a designated period of time expiring after the display device at the desired location began displaying the patron identifier.

3. The system of claim 1, wherein when executed by the processor, the instructions cause the processor to cause the display device at the desired location to display the patron identifier at least partially while the mobile device displays the patron identifier.

4. The system of claim 1, wherein when executed by the processor, the instructions cause the processor to cause the display device at the desired location to display the patron identifier at least partially while the mobile device displays patron directional information relative to the desired location within the gaming establishment.

5. The system of claim 1, wherein when executed by the processor, the instructions cause the processor to determine the patron identifier.

6. The system of claim 1, wherein when executed by the processor, the instructions cause the processor to determine that the patron has arrived at the desired location responsive to receiving an indication that the patron has been identified in association with the desired location.

7. The system of claim 1, wherein the desired location within the gaming establishment is selected from the group consisting of: a gaming table, an electronic gaming machine, a restaurant, a bar and a kiosk.

8. The system of claim 1, wherein when executed by the processor, the instructions cause the processor to communicatively connect, via the network interface, to a plurality of display devices at a plurality of locations within the gaming establishment, the plurality of display devices including the display device at the desired location within the gaming establishment.

9. A system comprising:
a processor; and
a memory device that stores instructions that, when executed by the processor, cause the processor to:
communicatively connect, via a network interface, to a mobile device of a patron,
receive, via the network interface and from the mobile device, data representing a request to find a desired location, the desired location being selected from the group consisting of: a gaming table, an electronic gaming machine, a restaurant, a bar and a kiosk,
prior to the patron arriving at the desired location, cause a display device, at the desired location and communicatively connected to the processor, to display a patron identifier, and
responsive to the patron not arriving at the desired location within a designated period of time after the display device at the desired location began displaying the patron identifier, cancel the request and cause the display device at the desired location to cease displaying the patron identifier.

10. The system of claim 9, wherein when executed by the processor, the instructions cause the processor to cause the display device at the desired location to display the patron identifier at least partially while the mobile device displays the patron identifier.

11. The system of claim 9, wherein when executed by the processor, the instructions cause the processor to cause the display device at the desired location to display the patron identifier at least partially while the mobile device displays patron directional information relative to the desired location.

12. A method of operating a system, the method comprising:
communicatively connecting, by a processor and via a network interface, to a mobile device of a patron,
receiving, via the network interface and from the mobile device, data representing a request to find a desired location within a gaming establishment, the desired location within the gaming establishment being different from a current location of the mobile device, and
prior to the patron arriving at the desired location within the gaming establishment, displaying, by a display device at the desired location, a patron identifier.

13. The method of claim 12, further comprising cancelling, by the processor, the request responsive to a designated period of time expiring after the display device at the desired location began displaying the patron identifier.

14. The method of claim 12, further comprising displaying, by the display device at the desired location, the patron identifier at least partially while the mobile device displays the patron identifier.

15. The method of claim 12, further comprising displaying, by the display device at the desired location, the patron identifier at least partially while the mobile device displays patron directional information relative to the desired location within the gaming establishment.

16. The method of claim 12, further comprising determining, by the processor, the patron identifier.

17. The method of claim 12, further comprising determining, by the processor, that the patron has arrived at the desired location responsive to receiving an indication that the patron has been identified in association with the desired location.

18. The method of claim 12, wherein the desired location within the gaming establishment is selected from the group consisting of: a gaming table, an electronic gaming machine, a restaurant, a bar and a kiosk.

19. The method of claim 12, further comprising communicatively connecting, by the processor and via the network interface, to a plurality of display devices at a plurality of locations within the gaming establishment, the plurality of display devices including the display device at the desired location within the gaming establishment.

* * * * *